(No Model.)  3 Sheets—Sheet 1.
J. W. BOWEN.
AUTOMATIC ELEVATOR STOP.
No. 568,425.  Patented Sept. 29, 1896.
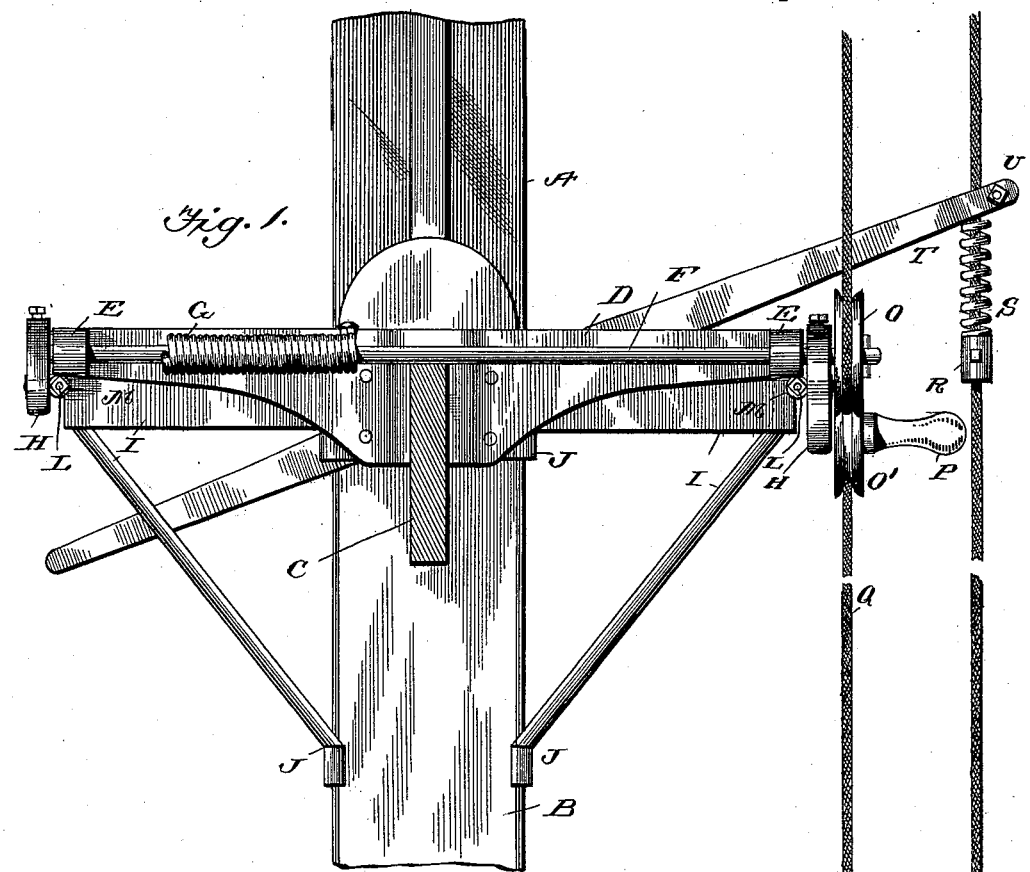
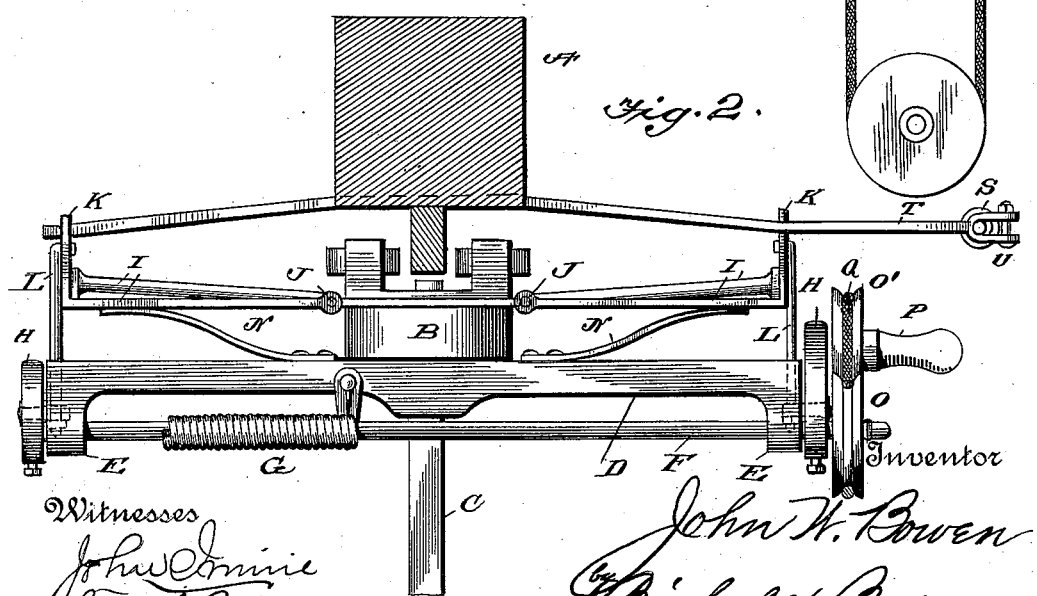

(No Model.) 3 Sheets—Sheet 2.

J. W. BOWEN.
AUTOMATIC ELEVATOR STOP.

No. 568,425. Patented Sept. 29, 1896.

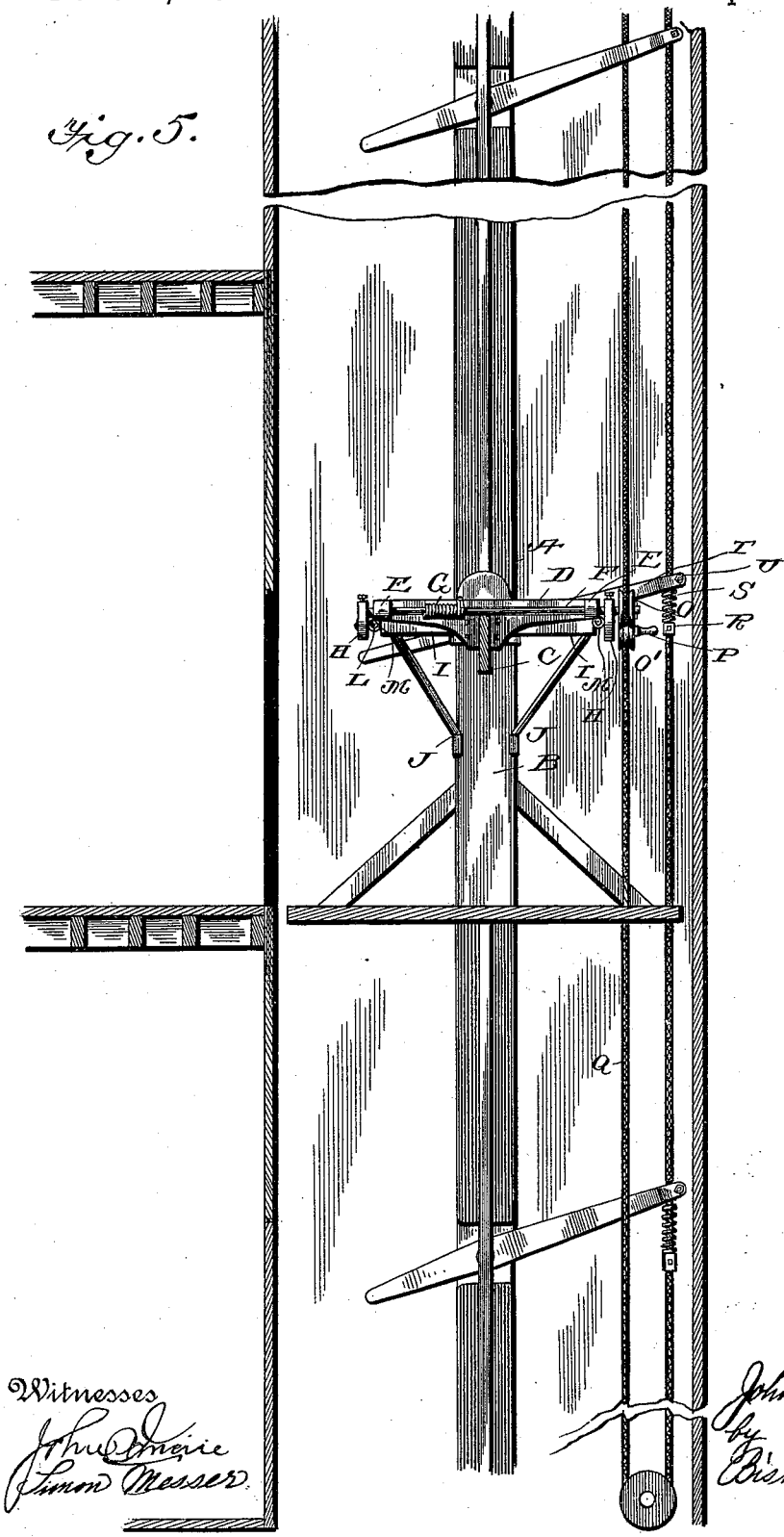

UNITED STATES PATENT OFFICE.

JOHN W. BOWEN, OF JACKSONVILLE, ILLINOIS.

AUTOMATIC ELEVATOR-STOP.

SPECIFICATION forming part of Letters Patent No. 568,425, dated September 29, 1896.

Application filed December 11, 1895. Serial No. 571,768. (No model.)

*To all whom it may concern:*

Be it known that I, JOHN W. BOWEN, a citizen of the United States, residing at Jacksonville, in the county of Morgan and State of Illinois, have invented certain new and useful Improvements in Automatic Stops for Elevators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my present invention is to provide a mechanism by means of which an elevator-car will be automatically stopped at the landings or other desired points unless intentionally prevented from doing so by the operator. This object I accomplish by the use of the construction illustrated in the accompanying drawings; and the invention consists in certain novel features hereinafter described and claimed.

Figure 3:
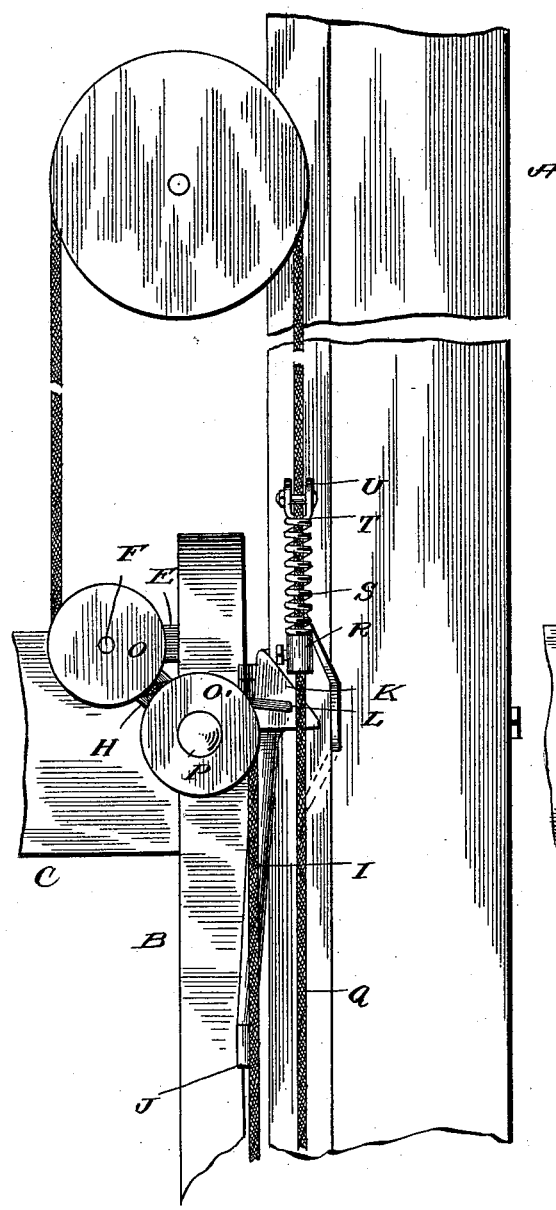
Figure 4:
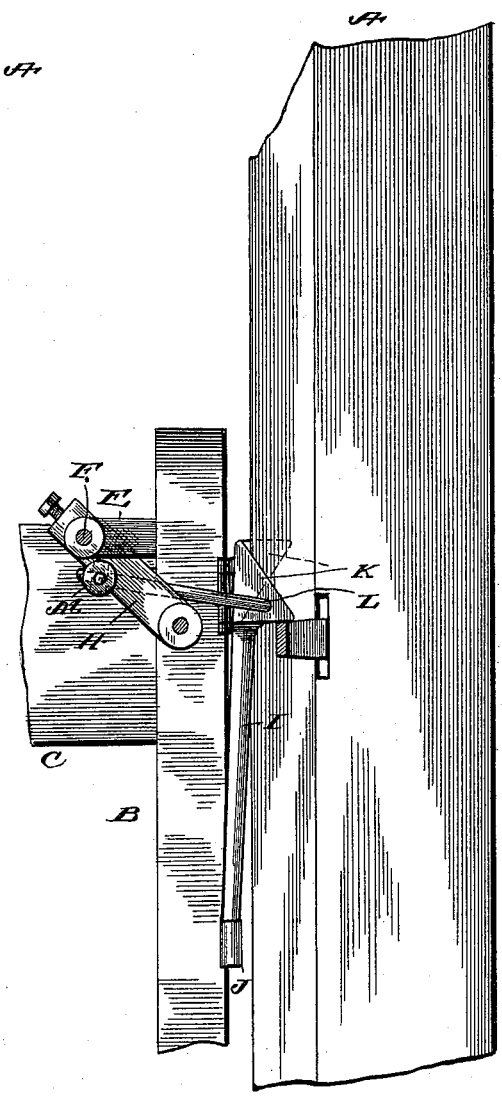

In the said drawings, Figure 1 is a sectional side view of my improved mechanism with the brake off. Fig. 2 is a sectional plan view of the same with the brake on. Fig. 3 is an end view thereof with the brake off. Fig. 4 is a sectional detail view showing the manner in which the device acts to stop the elevator, and Fig. 5 is a view showing a complete elevator-well.

In the drawings, for the sake of simplicity, I have shown my improvements applied to a small freight-elevator; but I wish to state at the outset that only slight modifications are necessary to adapt the mechanism for use on large passenger-elevators, and that the scope of the invention is not affected or limited by the character or size of the elevator-car to which it may be applied.

Referring particularly to the drawings by letter, A designates the guide-post in the elevator-well. B designates the side support of the elevator-car, and C a cross-beam of the same. These parts are of the usual or any preferred construction and form no part of my invention. In the drawings these parts are shown as they are arranged in a freight-elevator, but it will be understood, of course, that my improvements are applicable to all styles of elevator.

In carrying out my invention I secure to the side support B and the beam C of the car the rigid arm or bracket D, which projects horizontally to each side of the same, as clearly shown, and is provided at its ends with the lateral lugs or bearings E, in which a shaft F is journaled, said shaft being held in its normal position by a spring G, coiled around the shaft and having its ends secured, respectively, to the shaft and the bracket D. Crank-arms H are secured to the shaft F at or near the extremities of the same and depend downward and outward therefrom.

The locking-arms I are hinged to the edges of the side support, as shown at J, and are substantially triangular brackets provided at their upper outer corners with the locking heads or stops K, which project laterally outward and are connected with the crank-arms H by the links L. The outer ends of the links are pivoted directly to the stops or locking-heads, while their inner ends are inserted through eyes M on the crank-arms and secured by nuts, whereby they may be adjusted to take up wear or meet other requirements of each case. The upper edge of one of the locking-heads is beveled, and its lower edge is straight or square, so as to form a stop, while the other head has its lower edge beveled and its upper edge square to form a stop. The locking-arms are normally pressed outward by the springs N, which are secured to the outer side of the bracket D and bear against the locking-arms, as shown most clearly in Fig. 2. Grooved pulleys O O' are mounted idly on the front end of the shaft F and on the lower end of the front crank-arm, respectively, the pulley O' being shown as provided with a handle P, by which the device may be operated, as will be presently set forth.

The controlling or brake rope Q passes throughout the elevator-well in the usual manner and is carried under the pulley O and over the pulley O', as shown most clearly in Fig. 3. At various points along the rear branch of the operating rope or rod I secure the adjustable collars R, upon which rest springs S, coiled around the rope. Oscillatory rods T are pivoted at their centers upon the guide-post A and have their front ends formed into or provided with forks U, which pass around the rope and rest on the upper ends of the springs.

In operation the moving elevator carries the square edge or shoulder of one of the locking-heads K against the oscillatory bar T and forces said bar against the spring S and collar R, so that the continued movement of said bar will stop and lock the elevator-car. To release the elevator-car and permit it to continue its travel, a downward or upward pull is exerted on the front branch of the brake-rope, thereby drawing said pulley O' inward and downward and vibrating the crank-arms so as to pull the locking-arms away from the oscillatory bar and release the same and permit the oscillatory bar to return to its normal position.

It will thus be seen that the elevator-car is automatically stopped and locked against movement at each oscillatory bar, one of which will be provided at every landing. It will be observed that one of the locking-arms engages the oscillatory bar on the upward movement of the elevator-car and the other locking-arm engages said bar on the downward movement of the car, so that the proper operation is assured. Should it be desired to pass a landing without stopping, it is necessary only to pull the front branch of the brake-rope or swing the pulley O' downward and inward by means of the handle P, thereby withdrawing the locking-arms against the pressure of the springs N from the path of the oscillatory bars. After passing the landing, the handle P is released, and the springs G and N at once return the several parts to their normal positions.

The rope Q is merely a controlling-rope and does not travel with the elevator-car nor move at all except when actuated in the manner described to lock the car or operate the valve which controls the movements of the hoisting-engine. The pulleys O O' roll idly over the rope and serve merely to regulate the tension thereof. The springs S act as buffers for the oscillatory bars, and also serve to gradually return said bars to their normal positions when the rope is slackened by the swinging inward of the lower pulley. The starting and stopping of the elevator is thus accomplished without any jolting whatever.

Having thus described my invention, what I claim, and desire to secure by Letters Patent, is—

1. In an automatic stop for elevators, the combination with the car and the elevator-well, of a series of oscillatory bars pivoted on the side of the well and engaging the brake-rope, and a pair of locking-arms mounted on the car and adapted to engage said bars and lock the car, one arm engaging the bars on the upward movement of the car and the other arm engaging the bars on the downward movement of the car.

2. In an automatic stop for elevators, the combination with the car and the elevator-well, of a controlling-rope passing through the well, an oscillatory bar mounted on the side of the well and having a forked end fitting around the said rope, a collar secured on the rope below the forked end of the bar, a spring coiled around the rope between said collar and the forked end of the bar, and locking-arms mounted on the car and adapted to engage the oscillatory bar.

3. In an automatic stop for elevators, the combination with the car and the elevator-well, of an oscillatory bar mounted in the elevator-well, a controlling-rope passing through the well, and connected with said bar, locking-arms hinged on the side of the car, springs secured on the side of the car and bearing on the locking-arms to force the same into engagement with the oscillatory bar, and means for disengaging said arms from the bar.

4. In an automatic stop for elevators, the combination with the elevator-well and the car of an oscillatory bar mounted within the elevator-well the brake-rope connected with said bar, locking-arms mounted on the elevator-car and adapted to engage the oscillatory bar, springs holding said arms normally in the path of the oscillatory bar, crank-arms mounted on the elevator-car, connections between the crank-arms and the locking-arms, and mechanism for vibrating the crank-arms to release the locking-arms from the oscillatory bar.

5. The combination with the elevator-well and the car of an oscillatory bar mounted within the elevator-well, the brake-rope connected therewith, locking-arms mounted on the elevator-car and adapted to engage said bar, a rock-shaft mounted on the elevator-car and having crank-arms at its ends, a spring secured to said shaft and holding the crank-arms normally outward, connections between said crank-arms and the locking-arms, and means for rotating the rock-shaft against the tension of the spring.

6. The combination with the elevator-well and the car of an oscillatory bar mounted in the elevator-well the brake-rope connected therewith, locking-arms mounted on the elevator-car and adapted to engage the said bar, a rock-shaft mounted on the elevator-car and having crank-arms at its ends, a spring secured to said shaft and holding the crank-arms and the locking-arms normally outward, connections between the crank-arms and the oscillatory bar and pulleys mounted on the front end of the rock-shaft and the lower end of the front crank-arm and around which the brake-rope passes.

In testimony whereof I affix my signature in presence of two witnesses.

JOHN W. BOWEN.

Witnesses:
CHAS. A. BARNES,
H. J. JOHNSON.